(No Model.)

I. LEHMAN.
TIRE SETTER.

No. 512,560.  Patented Jan. 9, 1894.

WITNESSES:
F. Mc Ardle
C. Sedgwick

INVENTOR
I. Lehman
BY Munn & Co
ATTORNEYS.

UNITED STATES PATENT OFFICE.

ISAAC LEHMAN, OF ASHCROFT, CANADA.

TIRE-SETTER.

SPECIFICATION forming part of Letters Patent No. 512,560, dated January 9, 1894.

Application filed June 29, 1893. Serial No. 479,188. (No model.) Patented in Canada March 11, 1893, No. 42,259.

*To all whom it may concern:*

Be it known that I, ISAAC LEHMAN, of the town of Ashcroft, Kamloop's Division, district of Yale, Province of British Columbia and Dominion of Canada, have invented a new and Improved Tire-Setter, (for which I have obtained a patent in Canada, No. 42,259, dated March 11, 1893,) of which the following is a full, clear, and exact description.

My invention relates to an improvement in tire setters, and it has for its object to provide a machine exceedingly simple, durable and economic, whereby a pit may be readily formed and a platform adapted to receive a tire and wheel to be set, located within the pit in such manner that it may be conveniently and expeditiously raised and lowered, and whereby also the platform may be locked in an elevated position with an exceedingly simple yet durable locking device; and whereby further when the unlocking mechanism is released the platform will be carried downward to a lower position within the pit.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
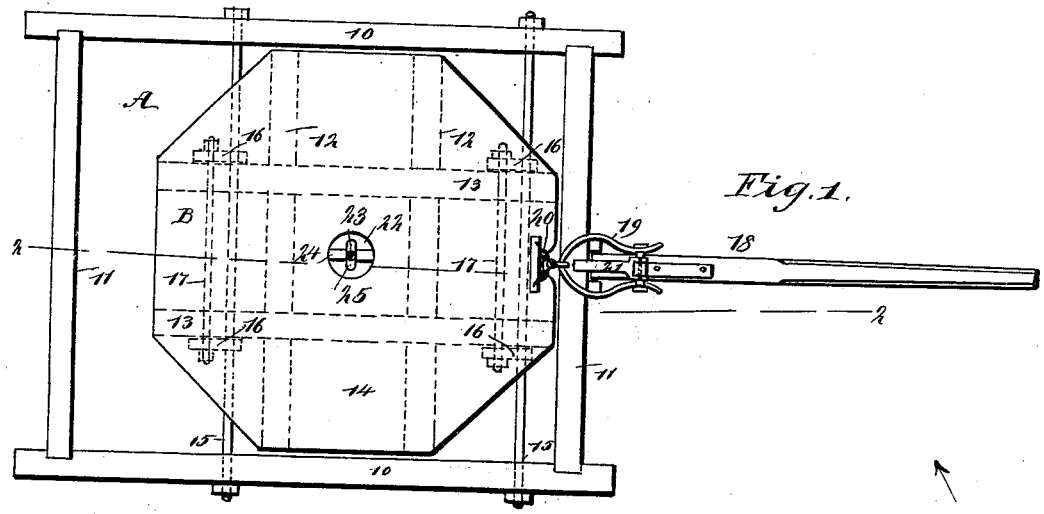
Figure 2:
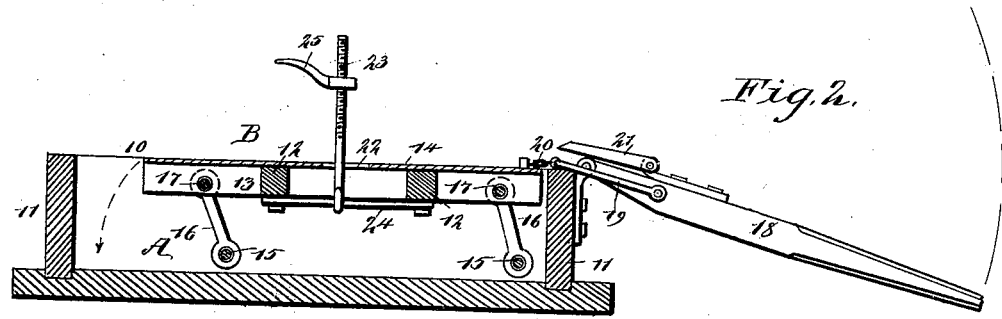

Figure 1 is a plan view of the tire setter; and Fig. 2 is a longitudinal vertical section thereof, on the line 2—2 in Fig. 1.

In carrying out the invention the pit A, is usually made rectangular in general contour, and is constructed of side beams 10 and end beams 11, the beams being bolted together or otherwise attached in any suitable or approved manner. The platform B, consists of a skeleton frame, comprising two parallel beams 12, arranged at predetermined distances apart, which beams for example extend in direction of the sides of the pit, and two other parallel beams 13, which extend in direction of the ends of the pit across the beams 12, and the two sets of beams are tied together in such manner that their upper surfaces are flush. The beams are covered by a sheathing 14, preferably of metal, but any other material may be employed for that purpose. The platform is of such size that it will loosely fit sidewise within the pit, but lengthwise the pit is longer than the platform. In the bottom of the pit two rods 15, are located, which extend from side to side, and each of these rods carries two links 16, the links being pivotally connected with the outer sides of the longitudinal beams 13 of the platform near the outer extremities of the said beams, and the pivotal connection is usually effected by passing a pin 17, through each two transversely-aligning links and the beams with which the links contact. The lower rods 15, are located one near the front end of the pit and the other between the center and the rear end thereof. A lever 18, is hinged about centrally upon the front upper portion of the pit; the lever may be of any approved length, or may be of any desired material, and the said lever at its hinged end is provided with a yoke 19, the yoke having a hinged connection with the lever some distance back of its hinge. The yoke extends beyond the hinged end of the lever, and is connected by a link 20, a chain or the equivalent thereof, with the central forward portion of the platform B. The lever is likewise provided with a dog 21, which is preferably hinged to the upper face of the lever and extends over and beyond the hinge on its inner end. Thus in practice when the lever is depressed, as shown in Fig. 2, the platform is elevated so that its upper face is practically flush with the upper edge of the pit, the platform being made to rise upon the links 16; and as the outer ends of the yoke 19, are forward of and below the point of the hinged connection with the lever and pit, when the lever is depressed and the platform elevated this connection serves to maintain the platform in its elevated position, and consequently no further lock is needed. When the platform is to be lowered in the pit, which latter may contain any material desired, the moment that the lever is raised sufficiently high to carry the forward end of the yoke above the point of fulcrum of the lever the platform will be unlocked and will be free to drop, and at that moment the dog 21 will strike the platform at or near its forward edge and will force the platform rearward, thus compelling it to rock upon its links and drop to the bottom of the pit.

I desire it to be distinctly understood that any equivalent of the dog and the yoke may be employed if in practice it is found desirable; and that the shape of the entire device may be changed or varied as occasion may demand; and furthermore, that the degree of throw of the platform may be changed without departing from the spirit of the invention.

In order to facilitate the attachment of the wheel to the platform an opening 22, is usually made in the top central portion thereof; and a bolt 23, is passed down through the opening, and is connected at its lower end to a plate 24, or like device, which is secured at its extremities to the transverse beams 12 of the platform, as shown in Fig. 2. The upper end of the bolt is usually provided with a nut 25 of the wing pattern, whereby when the bolt is passed through the hub of a wheel and the hub is brought to an engagement with the upper face of the platform, by turning the nut 25 downward the wheel may be held firmly in the desired position.

Having thus described my invention, I claim as new and desire to secure by Letters Patent—

1. A tire setter comprising a pit, a vertically and longitudinally movable platform within the pit, a lever pivoted at its inner end to the upper edge of one end of the pit—and a link pivoted to the said lever near its inner end and also pivotally connected to the adjacent end of the platform; the outer end of the link being constructed to swing forward of and below the axis of the lever when the latter is swung down and thereby lock the platform in its raised position, substantially as set forth.

2. In a tire setter, the combination, with a pit, and a platform and links supported therein, the said platform being capable of elevation and of depression, of a lever fulcrumed upon a fixed support, a connection between the lever and the platform, substantially as shown and described, and a dog carried by the lever, adapted for engagement with the platform when the lever is in its elevated position, substantially as and for the purpose specified.

3. In a tire setter, the combination, with the pit and a platform located within the pit, of less area in one direction than is the pit, of links pivotally connected with the platform and likewise pivoted to a fixed support within the pit, a lever pivoted to a fixed support, a link connection between the platform and lever, the link connecting with the lever forward of and below the plane of its fulcrum, and a dog carried by the lever, as and for the purpose specified.

ISAAC LEHMAN.

Witnesses:
J. J. MACKAY,
W. B. V. BAILEY.